(12) United States Patent
Pearson et al.

(10) Patent No.: US 11,693,464 B2
(45) Date of Patent: Jul. 4, 2023

(54) SHARED REDUNDANT POWER

(71) Applicant: Hewlett-Packard Development Company, L.P., Spring, TX (US)

(72) Inventors: Roger A. Pearson, Fort Collins, CO (US); Adolfo Gomez, Fort Collins, CO (US); Peter Seiler, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/435,432

(22) PCT Filed: Jul. 25, 2019

(86) PCT No.: PCT/US2019/043536
§ 371 (c)(1),
(2) Date: Sep. 1, 2021

(87) PCT Pub. No.: WO2021/015797
PCT Pub. Date: Jan. 28, 2021

(65) Prior Publication Data
US 2022/0164015 A1  May 26, 2022

(51) Int. Cl.
*G06F 1/30* (2006.01)
*G06F 11/20* (2006.01)

(52) U.S. Cl.
CPC ............ *G06F 1/30* (2013.01); *G06F 11/2015* (2013.01); *G06F 2201/805* (2013.01)

(58) Field of Classification Search
CPC ... G06F 1/30; G06F 11/2015; G06F 2201/805
See application file for complete search history.

(56) References Cited

U.S. PATENT DOCUMENTS

| 6,493,243 | B1 | 12/2002 | Real |
| 7,664,136 | B2* | 2/2010 | Toebes ................. H04L 12/10 370/463 |
| 7,898,111 | B1* | 3/2011 | Pistel ................... H02J 1/102 307/82 |
| 8,390,148 | B2 | 3/2013 | Shetty et al. |
| 8,405,254 | B2 | 3/2013 | Kitano |
| 9,164,560 | B2 | 10/2015 | Templeton et al. |
| 9,239,601 | B2 | 1/2016 | Messick et al. |
| 9,847,885 | B2 | 12/2017 | Wendt et al. |

(Continued)

FOREIGN PATENT DOCUMENTS

JP        2013258619 A    12/2013

*Primary Examiner* — Aurel Prifti
(74) *Attorney, Agent, or Firm* — Knobbe, Martens, Olson & Bear, LLP

(57) ABSTRACT

In some examples, a power adapter for sharing redundant power comprises a primary power input; a redundant power input; a redundant power supply identification signal (RPS ID) input; and a controller coupled to the RPS ID input. The controller is to direct power from the primary power input to an electronic device; direct power from the redundant power input to the electronic device, to another power adapter, or both; modify an RPS ID from the RPS ID input in response to directing power from the redundant power input to the electronic device; and output the modified RPS ID to the another power adapter.

13 Claims, 4 Drawing Sheets

(56) References Cited

U.S. PATENT DOCUMENTS

| | | | | |
|---|---|---|---|---|
| 2006/0080051 | A1* | 4/2006 | Breen | H02J 7/0068 |
| | | | | 702/60 |
| 2007/0250722 | A1* | 10/2007 | Montero | G06F 1/263 |
| | | | | 713/300 |
| 2008/0137386 | A1* | 6/2008 | Jitaru | G06F 1/263 |
| | | | | 363/146 |
| 2010/0067268 | A1* | 3/2010 | Kasprzak | H02M 3/335 |
| | | | | 363/74 |
| 2010/0253257 | A1* | 10/2010 | Clothier | H02P 6/085 |
| | | | | 318/400.12 |
| 2011/0179291 | A1* | 7/2011 | Weng | G06F 1/26 |
| | | | | 713/300 |
| 2012/0023351 | A1* | 1/2012 | Wakrat | G06F 1/3268 |
| | | | | 713/340 |
| 2012/0098338 | A1* | 4/2012 | Lew | H02J 9/061 |
| | | | | 307/29 |
| 2013/0002190 | A1* | 1/2013 | Ogura | H01M 10/46 |
| | | | | 320/101 |
| 2014/0070616 | A1* | 3/2014 | Shih | G06F 1/30 |
| | | | | 307/64 |
| 2014/0139020 | A1* | 5/2014 | Yang | H02J 9/005 |
| | | | | 307/25 |
| 2014/0265550 | A1 | 9/2014 | Milligan et al. | |
| 2015/0181529 | A1* | 6/2015 | Birnbaum | H04W 52/0258 |
| | | | | 370/311 |
| 2015/0200567 | A1* | 7/2015 | Huang | H02J 9/062 |
| | | | | 307/64 |
| 2015/0214781 | A1* | 7/2015 | Ye | H02J 9/061 |
| | | | | 307/64 |
| 2015/0363122 | A1* | 12/2015 | Hasegawa | G06F 3/0683 |
| | | | | 711/154 |
| 2017/0170733 | A1* | 6/2017 | Ferencz | H02J 9/061 |
| 2017/0222446 | A1* | 8/2017 | Tan | H02J 7/0042 |
| 2019/0064914 | A1* | 2/2019 | Krishnakumar | G06F 1/3234 |
| 2019/0332154 | A1* | 10/2019 | Thompson | G06F 1/3246 |
| 2020/0241614 | A1* | 7/2020 | Sultenfuss | H05B 45/00 |
| 2021/0232202 | A1* | 7/2021 | Sultenfuss | H02J 1/084 |
| 2021/0294401 | A1* | 9/2021 | Seiler | G06F 1/263 |
| 2022/0011841 | A1* | 1/2022 | Wee | G06F 1/3296 |
| 2022/0140732 | A1* | 5/2022 | Cheng | H02M 1/10 |
| | | | | 323/284 |

* cited by examiner

SHARED REDUNDANT POWER

BACKGROUND

An electronic device, such as a computer, is powered by a power supply. In some cases, the electronic device performs a function such that the uninterrupted operation of the electronic device is desirable. Thus, additional power supplies may be used to power the electronic device, thereby providing power supply redundancy to the electronic device.

BRIEF DESCRIPTION OF THE DRAWINGS

Various examples will be described below referring to the following figures.

DETAILED DESCRIPTION

Figure 1:
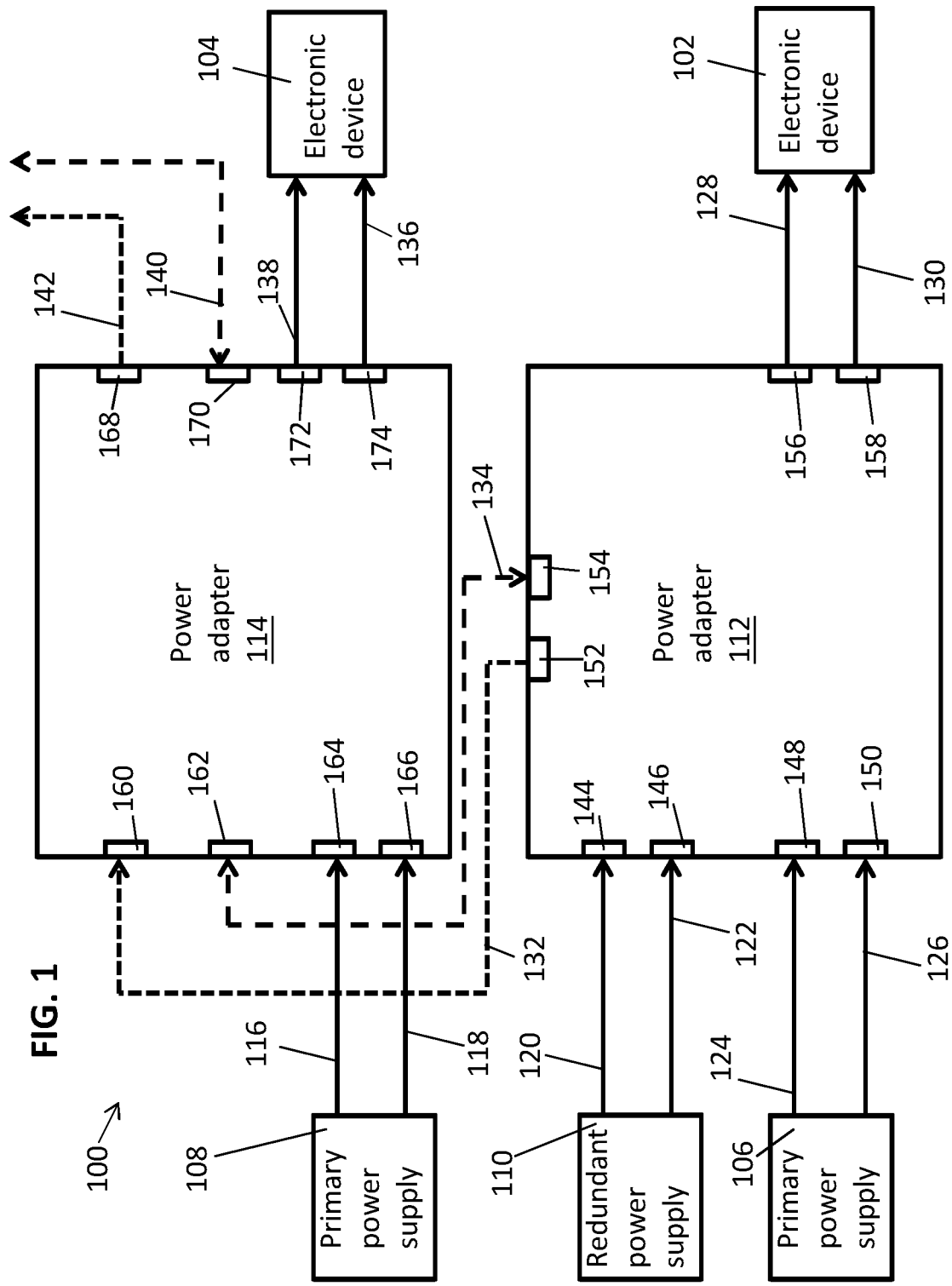
FIG. 1 is a block diagram of a system for sharing redundant power, in accordance with various examples.

Electronic systems may include numerous power supplies to power numerous electronic devices. Providing redundancy in such systems entails coupling each of the electronic devices to a primary power supply and to a backup (or redundant) power supply. Thus, for example, a system with 50 electronic devices may include 50 primary power supplies and 50 redundant power supplies. Power supply failure, however, is not a common event, and so many of these redundant power supplies are generally unnecessary. Moreover, each redundant power supply is expensive, so including a separate redundant power supply for each electronic device adds substantial cost.

This disclosure relates to the sharing of redundant power and describes a cost-efficient redundant power supply configuration in a system with multiple electronic devices. Specifically, each of the electronic devices in the system is powered by a separate primary power supply. However, instead of coupling each of the electronic devices to a dedicated redundant power supply, the novel redundant power supply configuration described herein includes sharing a single redundant power supply among multiple electronic devices. Continuing with the example above, instead of powering 50 electronic devices with 50 primary power supplies and 50 redundant power supplies, this disclosure describes a configuration in which the 50 electronic devices may be powered by 50 primary power supplies and fewer than 50 (e.g., 10) redundant power supplies. The general unlikelihood of power supply failure is leveraged such that a single redundant power supply provides redundancy for multiple (e.g., 5) electronic devices.

A system implementing the novel redundant power supply configuration described herein may include a first electronic device and a second electronic device. The first electronic device is powered by a first primary power supply that couples to the first electronic device via a first adapter. Likewise, the second electronic device is powered by a second primary power supply that couples to the second electronic device via a second adapter. The system also includes a redundant power supply coupled to the first adapter. This coupling between the redundant power supply and the first adapter includes a power supply connection and a redundant power supply identification signal (RPS ID). These two connections are also provided to the second adapter (and any subsequent "downstream" adapters) in a daisy-chain configuration.

The RPS ID may be an analog or digital signal that indicates the remaining power budget of the redundant power supply. For example, if the redundant power supply provides 300 W and both the first and second primary power supplies are functional, then the RPS ID may include an analog voltage that can be interpreted to correspond to 300 W. If the first primary power supply fails, the first adapter directs power from the redundant power supply to the first electronic device. In addition, the first adapter contains a controller that updates the RPS ID to account for the reduced power budget of the redundant power supply. This updated RPS ID may be available to some or all of the adapters in the system. Thus, some or all adapters in the system are informed that there is now less redundant power available. These and other features are now described with respect to the drawings.

FIG. 1 is a block diagram of a system 100 for sharing redundant power, in accordance with various examples. In examples, the system 100 comprises an electronic device 102 and an electronic device 104. In some examples, the system 100 may include any number of electronic devices, but FIG. 1 shows two electronic devices for clarity and ease of understanding. The electronic devices 102, 104 may include any suitable type of electronic device that may benefit from redundant power supplies, including laptops, notebooks, desktop computers, tablets, servers, smartphones, mobile electronic devices, security systems, medical devices, and any of a variety of other electronic devices. The electronic devices 102, 104 may be different types of electronic devices.

In addition, the system 100 includes a primary power supply 106, a primary power supply 108, and a redundant power supply 110. These power supplies may be of any suitable output power capability. In some examples, the power supplies have the same output power capabilities, and in other examples, the power supplies have different output power capabilities. In some examples, the redundant power supply 110 has a greater output power capability than either of the primary power supplies 106, 108. In some examples, the number of redundant power supplies in the system 100 is less than the number of primary power supplies in the system 100, because the system 100 is for sharing redundant power. In some examples, the primary power supply 106 is dedicated to the electronic device 102, and the primary power supply 108 is dedicated to the electronic device 104. In examples, the redundant power supply 110 is not dedicated to any particular electronic device, although the redundant power supply 110 may be dedicated to a specific group of electronic devices, such as a subset of electronic devices within a larger group of electronic devices. For instance, in a group of 4 electronic devices, a first redundant power supply may be dedicated to 2 of the 4 electronic devices, while a second redundant power supply is dedicated to the remaining 2 of the 4 electronic devices.

The system 100 also comprises a power adapter 112 and a power adapter 114. The power adapter 112 couples to the primary power supply 106, the redundant power supply 110, and the electronic device 102. The power adapter 114 couples to the primary power supply 108 and to the electronic device 104. The power adapter 114 also couples to the redundant power supply 110 by way of the power adapter 112, as explained below. In some examples, the system 100 includes a power adapter for each electronic device. Thus, because the system 100 can include any number of electronic devices, the system 100 may also include the same number of power adapters.

Each power adapter comprises multiple inputs and outputs to facilitate coupling with the power supplies, the electronic devices, and other power adapter(s). For instance, the power adapter 112 includes a primary power input 150, a primary power supply identification signal (PPS ID) input 148, a redundant power input 144, an RPS ID input 146, a PPS ID output 156, a power output 158, a redundant power output 152, and an RPS ID input/output 154. Likewise, the power adapter 114 comprises a primary power input 166, a PPS ID input 164, a redundant power input 160, an RPS ID input/output 162, a power output 174, a PPS ID output 172, a redundant power output 168, and an RPS ID input/output 170. The inputs 148 and 150 couple to the primary power supply 106 via connections 124, 126, respectively. The inputs 144, 146 couple to the redundant power supply 110 via connections 120, 122, respectively. The outputs 156, 158 couple to the electronic device 102 via connections 128, 130, respectively. The output 152 and the input/output 154 couple to the power adapter 114 via connections 132, 134, respectively. In the power adapter 114, the inputs 164, 166 couple to the primary power supply 108 via connections 116, 118, respectively. The input 160 and input/output 162 couple to the power adapter 112 via connections 132, 134, respectively. The outputs 172, 174 couple to the electronic device 104 via connections 138, 136, respectively. The output 168 and the input/output 170 couple to a next (e.g., third) power adapter via connections 142, 140, respectively. The connections 132, 134, 140, and 142 are shown in dashed lines because they represent a daisy-chain configuration between the power adapters of the system 100. The connections 134, 140 carry the RPS ID and thus are shown in a common dashed line type, while the connections 132, 142 carry redundant power and thus are shown in a common dashed line type. The daisy-chain configuration carrying redundant power and RPS IDs may be used to couple to any number of power adapters in the system 100.

In operation, the primary power supply 106 powers the electronic device 102 via the power adapter 112, and the primary power supply 108 powers the electronic device 104 via the power adapter 114. The redundant power output by the redundant power supply 110 is made available to the electronic device 102 in case the primary power supply 106 fails. Likewise, the redundant power output by the redundant power supply 110 is daisy-chained to the power adapter 114 via the connection 132, and thus this redundant power is also made available to the electronic device 104 via the power adapters 112, 114. This redundant power may power the electronic device 104 in case the primary power supply 108 fails. The RPS ID indicates the available redundant power budget and is distributed among some or all daisy-chained power adapters. In examples, all power adapters either store the same RPS ID or are in the process of updating such that all power adapters store the same RPS ID.

In an example operation, assume that the primary power supplies 106, 108 provide 200 W each, and the redundant power supply 110 provides 500 W. If the primary power supplies 106, 108 are operating properly, the redundant power supply 110 with a 500 W power budget will output an RPS ID indicating 500 W. This RPS ID is made available to the power adapters 112, 114, and any other power adapters in the daisy-chain. If, however, the primary power supply 106 fails, the power adapter 112 may route 200 W from the redundant power supply 110 to the electronic device 102. Thus, the electronic device 102 continues operation, but the available redundant power budget is reduced by 200 W to a total of 300 W. The power adapter 112 may update the RPS ID to indicate that the available redundant power budget is now 300 W, and it may update the RPS ID via connection 134 so that the power adapter 114 is informed that 300 W of redundant power is currently available. Further assume that the primary power supply 108 also fails. In this instance, the 300 W of redundant power being supplied to the power adapter 114 via the connection 132 is routed to the electronic device 104. Thus, the electronic device 104 maintains proper operation, but the available redundant power budget is again reduced by 200 W, leaving an available redundant power budget of 100 W. In this manner, the redundant power supply 110 may simultaneously power multiple electronic devices. The power adapter 114 updates the RPS ID locally (on the power adapter 114) and then sends the updated RPS ID to the power adapter 112 via the connection 134 and to a third power adapter (not expressly depicted) via the connection 140. If the third power adapter is daisy-chain coupled to a fourth power adapter, then the third power adapter propagates the updated RPS ID to the fourth power adapter, and the fourth power adapter may propagate the updated RPS ID to a fifth power adapter, and so on. Likewise, if the third power adapter in the daisy-chain were to issue an updated RPS ID, it would send a signal to the second and fourth power adapters. The fourth power adapter, in turn, would provide the updated RPS ID to the fifth power adapter, and the second power adapter would provide the updated RPS ID to the first power adapter.

As explained, a power adapter that updates the RPS ID issues signals on the appropriate outputs to inform immediately neighboring power adapters of the updated the RPS ID. However, to avoid conflicts between power adapters when attempting to update the RPS ID, in some examples, the power adapter issues a single signal to update the RPS ID and then ceases outputting the signal. When a power adapter receives a signal from another power adapter, it updates its memory (e.g., a data structure stored in memory) with the new RPS ID, issues a single signal to its neighboring power adapters to inform them of the updated RPS ID, and then ceases to issue the signal.

The power adapters 112, 114 also receive PPS IDs from the primary power supplies 106, 108, respectively. These PPS IDs may indicate the available primary power budget from the primary power supplies 106, 108. If the power adapter 112 receives an updated PPS ID indicating a zero power budget, the power adapter 112 recognizes this to mean that the primary power supply 106 has failed or has been unexpectedly removed, and the power adapter 112 begins to provide redundant power from the redundant power supply 110 to the electronic device 102. The power adapter 114 operates likewise.

In some examples, the RPS ID and/or PPS ID are communicated via wired connections 122, 124, 134, and 140. In other examples, the RPS ID and/or PPS ID are communicated via wireless connections 122, 124, 134, and 140, for example, using Bluetooth, radio frequency identification (RFID), or near-field communication (NFC) technology.

Figure 2:
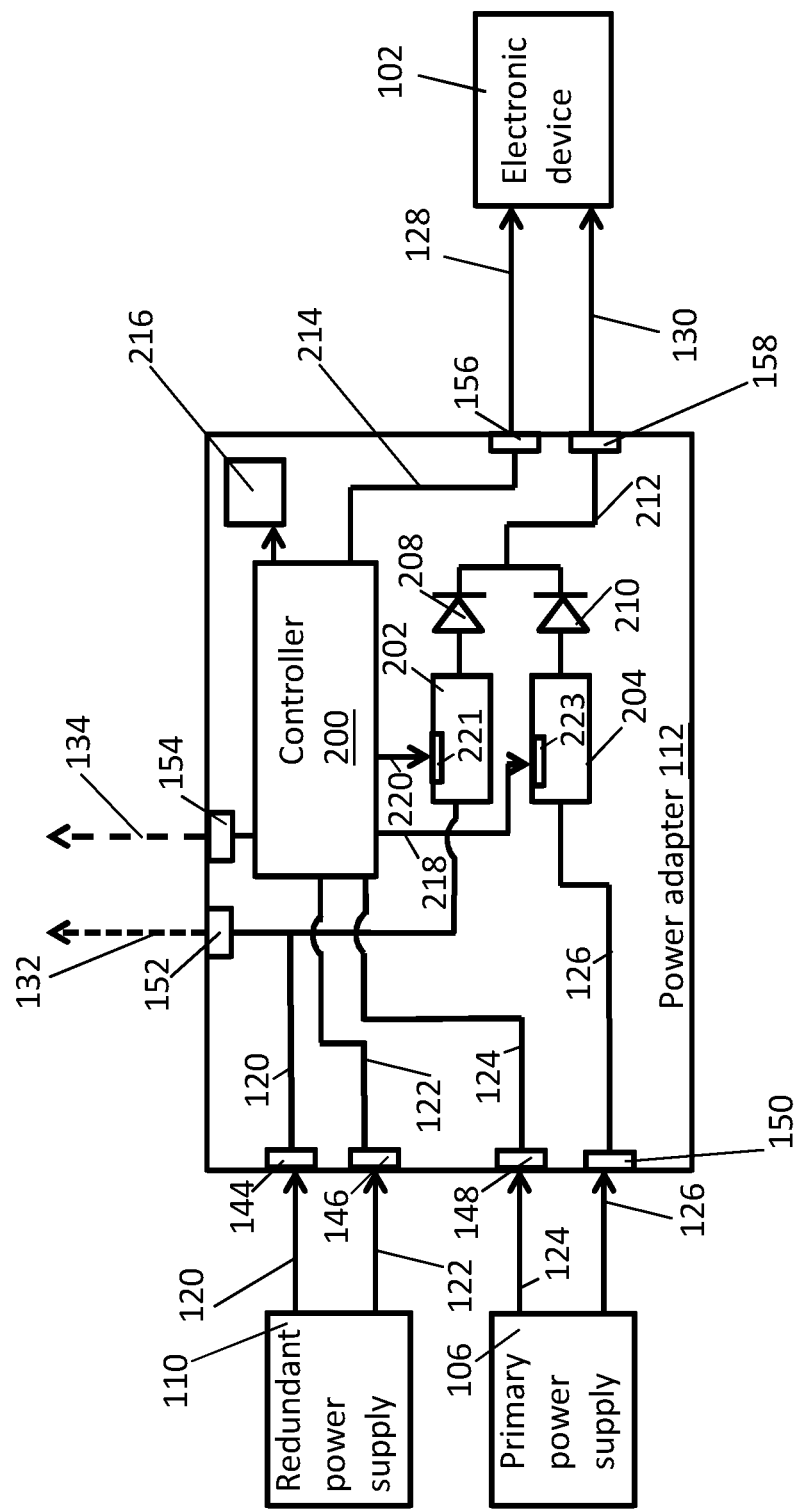
FIG. 2 is a block diagram of a power adapter for sharing redundant power, in accordance with various examples.

FIG. 2 is a block diagram of the power adapter 112 for sharing redundant power, in accordance with various examples. The power adapter 112 couples to the power supplies 106, 110 and the electronic device 102, as explained. In addition, FIG. 2 depicts the various inputs and outputs of the power adapter 112, as explained. In addition, the power adapter 112 comprises a controller 200, a buck-boost converter 202, a buck-boost converter 204, a diode 208, a diode 210, a connection 212 between the cathodes of the diodes 208, 210 to the power output 158, a connection 214 between the controller 200 and the PPS ID output 156, an alert indicator 216, a connection 218 between the controller 200 and the buck-boost converter 204, and a connection 220 between the controller 200 and the buck-boost converter 202.

In operation, the controller 200 receives the RPS ID and PPS ID via connections 122, 124, respectively. The controller 200 outputs enable signals to the buck-boost converters 202, 204 via the connections 220, 218, respectively. When the controller 200 enables the buck-boost converter 202 via an enable input 221, redundant power flows via connection 120 to the power output 158. The buck-boost converter 202 increases or decreases the voltage of the redundant power as desired. The diode 208 prevents damage to the buck-boost converter 202 and other components by, e.g., preventing the backflow of current. When the buck-boost converter 202 is disabled, no current flows through the buck-boost converter 202, and thus all of the redundant power output by the redundant power supply 110 is available to other power adapters in the system 100. Upon enabling the buck-boost converter 202, however, the available redundant power budget is decreased. As the enabling and disabling of the buck-boost converter 202 affects the available redundant power budget, the controller 200 may dynamically update the RPS ID upon enabling or disabling the buck-boost converter 202, as described above. When the controller 200 updates the RPS ID, it updates its own records (e.g., a data structure stored in memory), and then it issues a signal via the output input/output 154 to provide the update RPS ID to the power adapter 114, which in turn propagates the updated RPS ID downstream to the next power adapter, and so on. Likewise, as explained above, when the controller 200 receives an updated RPS ID from the power adapter 114, it updates its records to indicate the updated RPS ID. In this manner, in some examples, all of the power adapters in the system 100 contain the most current RPS ID.

When the controller 200 enables the buck-boost converter 204 via an enable input 223, primary power flows via the connection 126 to the power output 158. The buck-boost converter 204 increases or decreases the voltage of the redundant power as desired. The diode 210 prevents damage to the buck-boost converter 204 and other components.

Should the primary power supply 106 fail or be unexpectedly removed, the controller 200 may issue an alert via the alert indicator 216. This alert may take any of a variety of forms, including a blinking or flashing light (e.g., light emitting diode), a warning on a computer display, a text message, network traffic, an audible alarm, etc. Likewise, should the redundant power supply 110 fail or the available redundant power budget become too low to power any other electronic devices in the system 100, the controller 200 may also issue an alert via the alert indicator 216.

In some examples, the controller 200 provides the most current PPS ID via the output 156 to the electronic device 102. In this way, the electronic device 102 is informed of the status of its primary power supply 106. In some examples, the controller 200 may output the most current RPS ID via the output 156. In some examples, the controller 200 may output both the PPS ID and the RPS ID via the output 156.

The description provided herein of the operation of the controller 200 may also apply in some examples to a controller of the power adapter 114 and controllers of other power adapters that may be included in the system 100.

Figure 3:
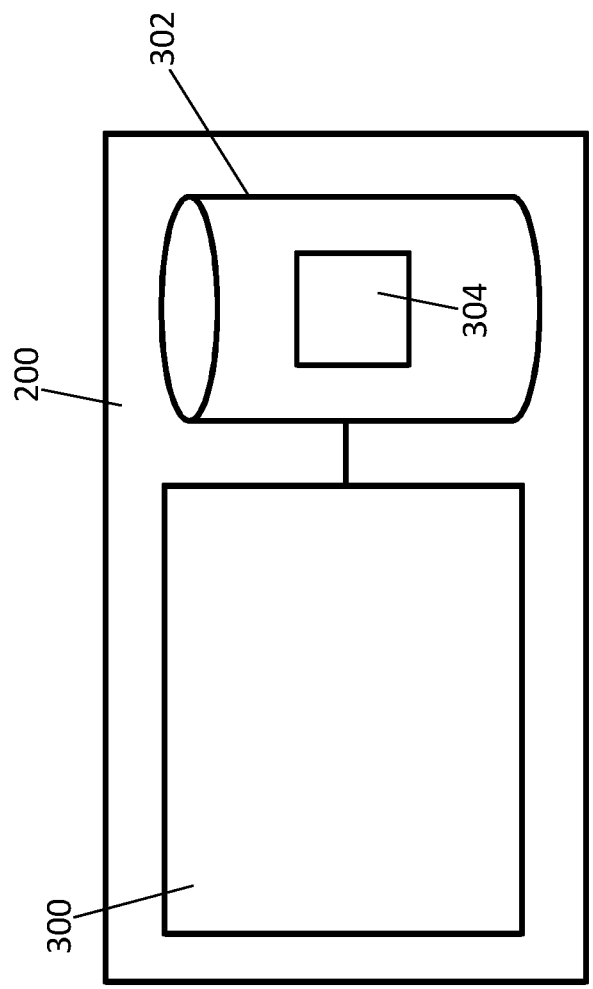
FIG. 3 is a block diagram of a controller in a power adapter for sharing redundant power, in accordance with various examples.

FIG. 3 is a block diagram of the controller 200 in a power adapter for sharing redundant power, in accordance with various examples. The controller 200 includes a processor 300 coupled to a memory 302. The memory 302 includes executable code 304. The processor 300 executes the executable code 304, which causes the processor 300 to perform some or all of the actions attributed herein to the controller 200.

Figure 4:
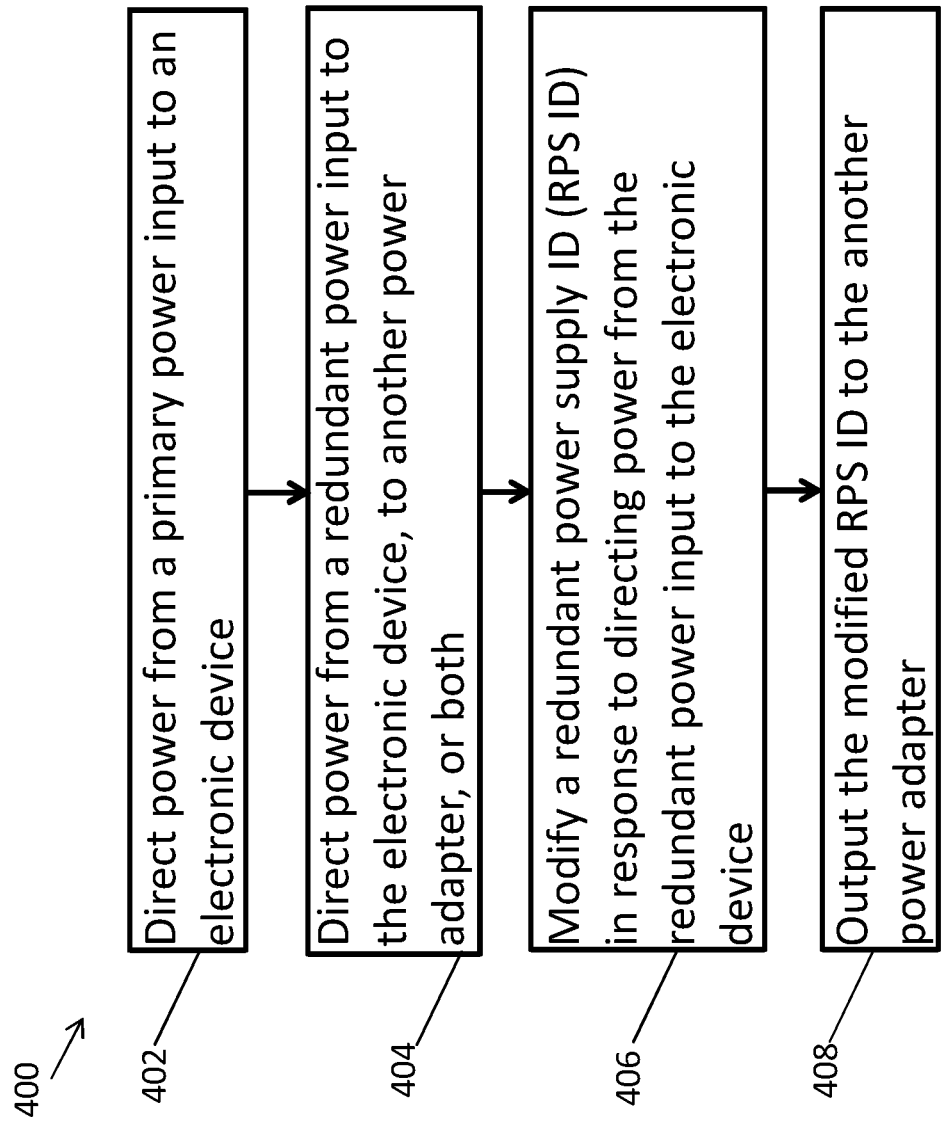
FIG. 4 is a flow diagram of a method for operating a power adapter for sharing redundant power, in accordance with various examples.

FIG. 4 is a flow diagram of a method 400 for operating a power adapter for sharing redundant power, in accordance with various examples. In examples, the method 400 is performed by a power adapter, such as the power adapter 112. The method 400 comprises directing power from a primary power input to an electronic device (402). The method 400 comprises directing power from a redundant power input to the electronic device, to another power adapter, or both (404). For example, in case of failure of the primary power supply, the power adapter 112 may direct power from the redundant power supply to the electronic device 102. The method 400 further includes modifying an RPS ID in response to directing power from the redundant power input to the electronic device (406). The method 400 also comprises outputting the updated RPS ID to the other power adapter (408).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A first power adapter for sharing redundant power, comprising:
    a primary power input;
    a redundant power input;
    a redundant power supply identification signal (RPS ID) input; and
    a controller coupled to the RPS ID input, the controller to:
        direct power from a primary power supply through the primary power input to an electronic device;
        direct power from a redundant power supply through the redundant power input to the electronic device, to a second power adapter, or both;
        modify a first RPS ID from the RPS ID input to a second RPS ID in response to directing power from the redundant power supply through the redundant power input to the electronic device, the first RPS ID indicating a first available power budget of the redundant power supply;
        output the second RPS ID to the second power adapter; and
        receive a third RPS ID from the second power adapter, wherein the second RPS ID indicates a second available power budget of the redundant power supply and the third RPS ID indicates a third available power budget of the redundant power supply, wherein the second available power budget differs from the third available power budget.

2. The first power adapter of claim 1, comprising a first buck-boost converter coupled to the primary power input and to a power output, the power output to couple to the electronic device.

3. The first power adapter of claim 2, comprising a second buck-boost converter coupled to the redundant power input and to the power output.

4. The first power adapter of claim 3, comprising a first diode coupled to the first buck-boost converter and the power output and a second diode coupled to the second buck-boost converter and the power output.

5. The first power adapter of claim 1, wherein the primary power input is to couple to a primary power supply, and wherein the controller is to receive a primary power supply identification signal (PPS ID), the PPS ID indicating a status of the primary power supply.

6. The first power adapter of claim 5, wherein the controller is to provide redundant power from the redundant power input to the electronic device based on the PPS ID.

7. The first power adapter of claim 1, wherein the RPS ID input is to couple to the redundant power supply, and wherein the first RPS ID comprises an analog voltage.

8. A system for sharing redundant power, comprising:
   a first buck-boost converter coupled to a primary power input and to a power output;
   a first diode positioned between the first buck-boost converter and the power output
   a second buck-boost converter coupled to a redundant power input and to the power output;
   a second diode positioned between the second buck-boost converter and the power output;
   a redundant power output coupled to the redundant power input; and
   a controller coupled to a redundant power supply identification signal (RPS ID) input, to an RPS ID output, to an enable input of the first buck-boost converter, and to an enable input of the second buck-boost converter.

9. The system of claim 8, wherein the controller is to update a first RPS ID to a second RPS ID based on an available power budget of a redundant power supply coupled to the redundant power input, and wherein the controller is to output the updated second RPS ID on the RPS ID output.

10. The system of claim 8 comprising a second controller, the second controller coupled to a second primary power supply and to an electronic device, the second controller to:
    determine that the second primary power supply has failed;
    provide power from a redundant power supply to the electronic device, the redundant power supply coupled to the redundant power input and the redundant power output;
    update a first RPS ID to a second RPS ID based on an available power budget of the redundant power supply; and
    output the second RPS ID to the controller.

11. A system for sharing redundant power, comprising:
    a first electronic device;
    a first power adapter coupled to the first electronic device;
    a first primary power supply coupled to the first power adapter;
    a second electronic device;
    a second power adapter coupled to the second electronic device;
    a second primary power supply coupled to the second power adapter; and
    a redundant power supply coupled to the first power adapter via a first power supply connection and a first redundant power supply identification signal (RPS ID) connection, the first power adapter coupled to the second power adapter via a second power supply connection and a second RPS ID connection,
    wherein the first power adapter to:
        update a first RPS ID received from the first RPS ID connection to a second RPS ID based on power consumption by the first electronic device; and
        output the second RPS ID to the second power adapter, and
    wherein the first RPS ID indicates a first available power budget of the redundant power supply and the second RPS ID indicates a second available power budget of the redundant power supply.

12. The system of claim 11, wherein the first and second power supply connections connect to each other.

13. The system of claim 11, wherein the redundant power supply is to simultaneously provide power to the first and second electronic devices.

* * * * *